United States Patent
Adibhatla

(10) Patent No.: US 10,378,376 B2
(45) Date of Patent: Aug. 13, 2019

(54) METHOD AND SYSTEM FOR ADJUSTING AN OPERATING PARAMETER AS A FUNCTION OF COMPONENT HEALTH

(71) Applicant: General Electric Company, Schenectady, NY (US)

(72) Inventor: Sridhar Adibhatla, Glendale, OH (US)

(73) Assignee: General Electric Company, Schenectady, NY (US)

( * ) Notice: Subject to any disclaimer, the term of this patent is extended or adjusted under 35 U.S.C. 154(b) by 113 days.

(21) Appl. No.: 15/478,949

(22) Filed: Apr. 4, 2017

(65) Prior Publication Data

US 2018/0283278 A1    Oct. 4, 2018

(51) Int. Cl.
| | | |
|---|---|---|
| F01D 21/00 | (2006.01) | |
| F02C 9/00 | (2006.01) | |
| F01D 21/14 | (2006.01) | |
| F01D 25/12 | (2006.01) | |

(52) U.S. Cl.
CPC ........... *F01D 21/003* (2013.01); *F01D 21/14* (2013.01); *F01D 25/12* (2013.01); *F02C 9/00* (2013.01); *F05D 2220/323* (2013.01); *F05D 2260/80* (2013.01); *F05D 2270/11* (2013.01); *F05D 2270/112* (2013.01); *F05D 2270/3032* (2013.01)

(58) Field of Classification Search
CPC ............. F02C 7/12; F02C 3/06; F01D 21/003
See application file for complete search history.

(56) References Cited

U.S. PATENT DOCUMENTS

| | | |
|---|---|---|
| 6,463,380 B1 | 10/2002 | Ablett et al. |
| 7,079,957 B2 | 7/2006 | Finnigan et al. |
| 7,431,557 B2 | 10/2008 | Herron et al. |
| 7,891,938 B2 | 2/2011 | Herron et al. |
| 8,177,474 B2 | 5/2012 | Andarawis et al. |
| 8,296,037 B2 | 10/2012 | Plunkett et al. |
| 8,894,358 B2 | 11/2014 | Bacic |
| 8,939,715 B2 | 1/2015 | Miller |
| 8,996,277 B2 | 3/2015 | Beecroft et al. |
| 9,014,945 B2 | 4/2015 | Abrol et al. |
| 9,266,618 B2 | 2/2016 | Tillman et al. |

(Continued)

FOREIGN PATENT DOCUMENTS

EP    2 317 461 A1    5/2011

OTHER PUBLICATIONS

International Search Report and Written Opinion issued in connection with corresponding PCT Application No. PCT/US2018/014767 dated May 9, 2018.

*Primary Examiner* — Anne M Antonucci
*Assistant Examiner* — Renee LaRose
(74) *Attorney, Agent, or Firm* — General Electric; Sean Weinman

(57) ABSTRACT

Systems and methods for adjusting an operating parameter of a machine based on an operating state of a component of the machine are provided. A method may be implemented by an electronic control unit (ECU) of the machine and includes determining that a performance of the machine has degraded. The method further includes selecting a predetermined adjustment to the operating parameter, wherein the selected predetermined adjustment reduces an effect of the operating state of the component on the performance of the machine, and operating the machine using the selected predetermined adjustment to the operating parameter.

10 Claims, 7 Drawing Sheets

(56) References Cited

U.S. PATENT DOCUMENTS

| | | |
|---|---|---|
| 2008/0201104 A1 | 8/2008 | Poncet et al. |
| 2009/0055145 A1 | 2/2009 | Volponi et al. |
| 2012/0095662 A1 | 4/2012 | Roy et al. |
| 2013/0024179 A1 | 1/2013 | Mazzaro et al. |
| 2014/0257666 A1* | 9/2014 | Abrol ................ F02C 9/48 |
| | | 701/100 |

* cited by examiner

METHOD AND SYSTEM FOR ADJUSTING AN OPERATING PARAMETER AS A FUNCTION OF COMPONENT HEALTH

STATEMENT REGARDING FEDERALLY SPONSORED RESEARCH & DEVELOPMENT

This invention was made with Government support under contract number DTWAFA-10-C-00046 awarded by the Federal Aviation Administration (FAA). The U.S. Government may have certain rights in this invention.

BACKGROUND

The field of the disclosure relates generally to machinery operating parameters and, more particularly, to a method and system for adjusting one or more operating parameters of a machine as based on machine health.

In at least some known machinery systems, certain machinery components are designed and operated to accommodate "worst-case" conditions. For example, rotating components (e.g., compressors, turbines) and cooling systems of at least some known machinery systems are configured to function under the highest temperature conditions. However, operating with such configurations under other conditions can lead to inefficiencies, for example, in fuel burn and/or machinery performance. Therefore, it would be beneficial to take advantage of increasing computing power in order to monitor actual operating conditions of one or more machinery components, to modify operating parameters of the one or more machinery components based on the actual operating conditions to improve performance and/or efficiency thereof.

BRIEF DESCRIPTION

In one aspect, a method for adjusting an operating parameter of a machine based on an operating state of a component of the machine is provided. The method includes determining that a performance of the machine has degraded over time. The method also includes selecting a predetermined adjustment to the operating parameter, wherein the selected predetermined adjustment reduces an effect of the operating state of the component on the performance of the machine, and operating the machine using the selected predetermined adjustment to the operating parameter.

In one aspect of the disclosure, which may include at least a portion of the subject matter of any of the preceding and/or following examples and aspects, the method further includes identifying the component of the machine that has caused the performance degradation.

In one aspect of the disclosure, which may include at least a portion of the subject matter of any of the preceding and/or following examples and aspects, identifying the component of the machine that has caused the performance degradation includes implementing a model of at least a portion of the machine that models an expected performance of the machine and compares the actual performance to the expected performance.

In one aspect of the disclosure, which may include at least a portion of the subject matter of any of the preceding and/or following examples and aspects, implementing the model includes determining the actual performance using sensor data from at least one sensor associated with the component of the machine that has caused the performance degradation.

In one aspect of the disclosure, which may include at least a portion of the subject matter of any of the preceding and/or following examples and aspects, the method further includes identifying the operating parameter of the machine that is associated with the operation of the identified component.

In one aspect of the disclosure, which may include at least a portion of the subject matter of any of the preceding and/or following examples and aspects, the method further includes confirming the operating state of the component of the machine.

In one aspect of the disclosure, which may include at least a portion of the subject matter of any of the preceding and/or following examples and aspects, confirming the operating state of the component includes performing an inspection to confirm the operating state of the component.

In one aspect of the disclosure, which may include at least a portion of the subject matter of any of the preceding and/or following examples and aspects, selecting a predetermined adjustment to the operating parameter includes determining a total adjustment for the operating parameter that is estimated to restore at least a portion of the degraded performance, and automatically implementing a first adjustment for the operating parameter that is less than the determined adjustment.

In one aspect of the disclosure, which may include at least a portion of the subject matter of any of the preceding and/or following examples and aspects, the method further includes manually implementing a second adjustment for the operating parameter such that the first adjustment and second adjustment approximate the determined total adjustment.

In one aspect of the disclosure, which may include at least a portion of the subject matter of any of the preceding and/or following examples and aspects, the method further includes manually implementing the selected predetermined adjustment of the operating parameter.

In one aspect of the disclosure, which may include at least a portion of the subject matter of any of the preceding and/or following examples and aspects, manually implementing the selected predetermined adjustment includes adjusting a position of one or more machine configuration pins.

In one aspect of the disclosure, which may include at least a portion of the subject matter of any of the preceding and/or following examples and aspects, operating the machine using the selected predetermined adjustment to the operating parameter includes increasing an amount of cooling flow to the component.

In another aspect, an electronic control unit (ECU) for adjusting an operating parameter of an engine based on an operating state of a component of the engine is provided. The ECU includes a memory, and a processor in communication with the memory. The processor is programmed to determine that a performance of the engine has degraded, select a predetermined adjustment to the operating parameter, wherein the selected predetermined adjustment reduces an effect of the operating state of the component on the performance of the engine, and operate the engine using the selected predetermined adjustment to the operating parameter.

In one aspect of the disclosure, which may include at least a portion of the subject matter of any of the preceding and/or following examples and aspects, the processor is further programmed to identify the component of the engine that has caused the performance degradation.

In one aspect of the disclosure, which may include at least a portion of the subject matter of any of the preceding and/or following examples and aspects, the processor is further programmed to implement a model of at least a portion of the engine to identify the component of the engine that has caused the performance degradation, wherein the model models an expected performance of the engine and compares the actual performance to the expected performance.

In one aspect of the disclosure, which may include at least a portion of the subject matter of any of the preceding and/or following examples and aspects, the ECU is communicatively coupled to a cooling system of the engine, and the processor is further programmed to select an increased amount of cooling flow to the identified component of the engine, and implement the increased amount of cooling flow to the identified component.

In a further aspect, a turbofan engine is provided. The turbofan engine includes a core turbine engine including a multistage compressor, the compressor powered by a high-pressure turbine driven by gas generated in the core turbine engine, and an electronic control unit (ECU). The ECU includes a memory, and a processor in communication with the memory. The processor is programmed to determine that a performance of the core turbine engine has degraded, select a predetermined adjustment to an operating parameter of a component of said core turbine engine that is operating in a non-initial operating state, wherein the selected predetermined adjustment reduces an effect of the operating state of the component on the performance of said core turbine engine, and operate the core turbine engine using the selected predetermined adjustment to the operating parameter.

In one aspect of the disclosure, which may include at least a portion of the subject matter of any of the preceding and/or following examples and aspects, the processor is further programmed to identify the component of said core turbine engine that has caused the performance degradation.

In one aspect of the disclosure, which may include at least a portion of the subject matter of any of the preceding and/or following examples and aspects, the processor is further programmed to implement a model of at least a portion of said core turbine engine to identify the component of said core turbine engine that has caused the performance degradation, wherein the model models an expected performance of said core turbine engine and compares the actual performance to the expected performance.

In one aspect of the disclosure, which may include at least a portion of the subject matter of any of the preceding and/or following examples and aspects, the turbofan engine further includes a cooling system configured to provide a cooling flow to one or more components of the turbofan engine. The processor is further programmed to select an increased amount of cooling flow to the identified component of the machine, and implement the increased amount of cooling flow to the identified component.

DRAWINGS

These and other features, aspects, and advantages of the present disclosure will become better understood when the following detailed description is read with reference to the accompanying drawings in which like characters represent like parts throughout the drawings, wherein.

Figure 1:
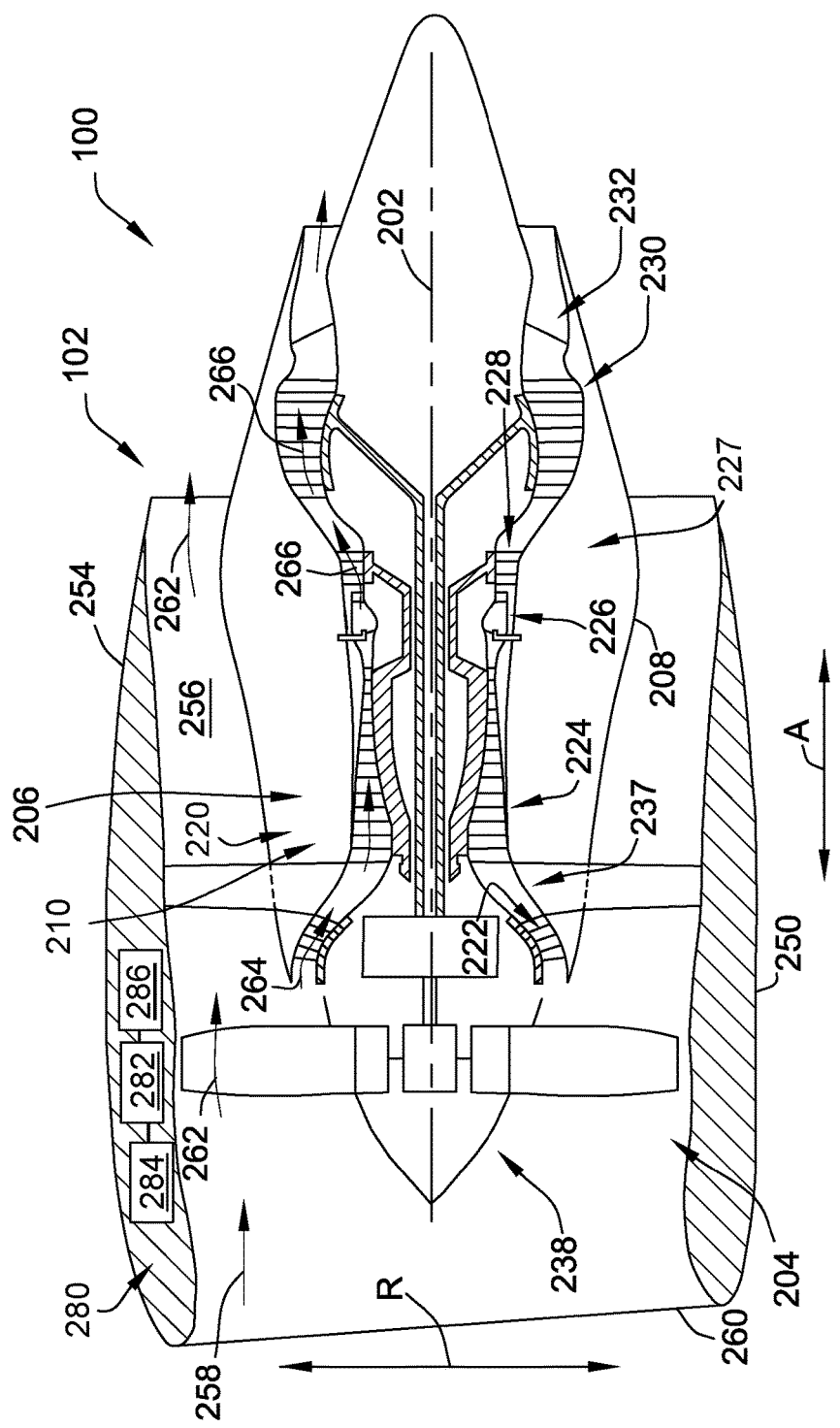
FIG. 1 is a schematic illustration of an exemplary gas turbine engine in accordance with an example embodiment of the present disclosure.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise. "Optional" or "optionally" means that the subsequently described event or circumstance may or may not occur, and that the description includes instances where the event occurs and instances where it does not. As used herein, the terms "axial" and "axially" refer to directions and orientations that extend substantially parallel to a centerline of an engine. Moreover, the terms "radial" and "radially" refer to directions and orientations that extend substantially perpendicular to the centerline of the engine. In addition, as used herein, the terms "circumferential" and "circumferentially" refer to directions and orientations that extend arcuately about the centerline of the engine.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

Embodiments of the systems described herein provide a cost-effective method for modeling and monitoring actual machine performance in order to identify one or more machine components operating in a non-initial operating state. As used herein, "non-initial" operating state refers generally to an operating state different from an initial operating state. The non-initial operating state may be sufficiently different from the initial operating state to cause a performance degradation, and may be outside of a threshold range of operation surrounding the initial operating state. The system may use stored machine performance data to model and monitor machine performance. In some embodiments, the machine is an engine for an aircraft, and the system may include a ground-based system that uses stored engine data to model and monitor engine performance and/or may include an aircraft system that includes an electronic control unit (ECU) configured to model and monitor engine performance. The operating state (i.e., the non-initial operating state) of the one or more machine components is manually and/or automatically confirmed. The system uses information associated with the component operating state to adjust and one or more operating parameters of the one or more components to compensate for the non-initial operating state, to improve performance of the component and to increase its operating lifetime. Accordingly, the system described herein facilitates increasing the efficiency and operating lifetime of a machine, such as efficiency and time-on-wing of an engine, as the component can be more efficiently operated for a longer period of time. The methods described herein may be implemented on a plurality of engine types, including aircraft engines, ground-based turbine engine used in power generation, and/or any other engine type. Moreover, the methods described herein may be implemented on substantially any machine, and is not limited to use in engines.

FIG. 1 is a schematic cross-sectional view of a machine 100 in accordance with an exemplary embodiment of the present disclosure. Although the illustrated embodiment includes machine 100 embodied as an engine 102, it should be understood that machine 100 is not limited to engine 102. In the example embodiment, engine 102 is more specifically embodied as a high-bypass turbofan jet engine. As shown in FIG. 1, engine 102 defines an axial direction A (extending parallel to a longitudinal axis 202 provided for reference) and a radial direction R. In general, engine 102 includes a fan assembly 204 and a core turbine engine 206 disposed downstream from fan assembly 204. In the example embodiment, core turbine engine 206 includes an engine case 208 that at least partially surrounds a plurality of components 210, which may also be referred to as "engine components" and/or "machine components" herein. Specifically, engine case 208 surrounds, in serial flow relationship, a compressor section 220 including a booster or low pressure (LP) compressor 222 and a high pressure (HP) compressor 224; a combustor 226; a turbine section 227 including a high pressure (HP) turbine 228 and a low pressure (LP) turbine 230; and a jet exhaust nozzle section 232. In other words, components 210 may include, but are not limited to, LP compressor 222, HP compressor 224, combustor 226, HP turbine 228, and LP turbine 230. Compressor section 220, combustor 226, turbine section 227, and jet exhaust nozzle section 232 together define a core air flowpath 237.

Fan assembly 204 include a fan 238, as well as an annular fan casing or outer nacelle 250 that circumferentially surrounds fan 238 and/or at least a portion of core turbine engine 206. Components 210 may further include fan 238. A downstream section 254 of nacelle 250 may extend over an outer portion of core turbine engine 206 so as to define a bypass duct 256 therebetween.

During operation of engine 102, a volume of air 258 enters engine 102 through an inlet opening 260. As volume of air 258 passes through fan assembly 204, a bypass portion 262 of volume of air 258 is directed or routed into bypass duct 256, and a core engine portion 264 of volume of air 258 is directed or routed into core air flowpath 237, or more specifically into LP compressor 222. The pressure of core engine portion 264 is increased as it is routed through high pressure (HP) compressor 224 and into combustor 226, where it is mixed with fuel and burned to provide combustion gases 266. Combustion gases 266 are routed through HP turbine 228 and/or LP turbine 230 where thermal and/or kinetic energy from combustion gases 266 is extracted to drive rotation of LP compressor 222, HP compressor 224, and/or fan 238. Combustion gases 266 are subsequently routed through jet exhaust nozzle section 232 of core turbine engine 206 to provide propulsive thrust.

In the illustrated embodiment, a hollow compartment 280 radially inward of nacelle 250 houses one or more mechanical or electronic components 210 therein. More specifically, hollow compartment 280 houses components 210 including a cooling system 282 as well as a full authority digital engine control (FADEC) 284. Cooling system 282 includes at least one cooling airflow source, such as at least one cooling fan 286 positioned within hollow compartment 280, configured to deliver a cooling airflow to at least one of HP turbine 228, LP turbine 230, LP compressor 222, HP compressor 224, and/or any other component 210 within engine 102. FADEC 284 is coupled, either by wired or wirelessly connectivity, in communication with one or more subsystems or components 210 of engine 102 and cooling system 282 to control the operation of engine 102 and cooling system 282, as will be explained in more detail below.

Engine 102 is depicted in the figures by way of example only, and in other exemplary embodiments, engine 102 may have any other suitable configuration including for example, a turboprop engine, a military purpose engine, a ground-based power-generation turbine engine, and a marine or land-based aero-derivative engine.

Figure 2:
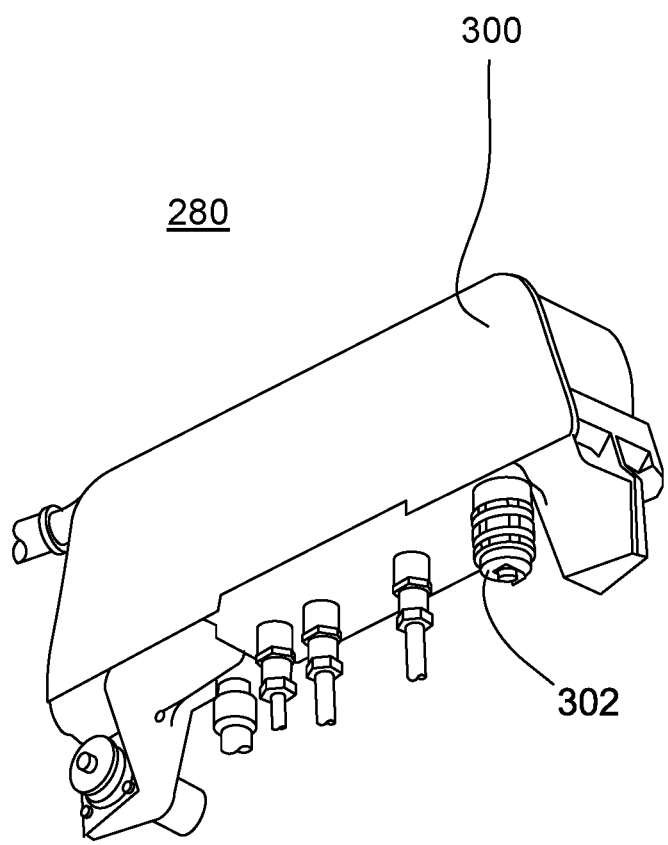
FIG. 2 is an enlarged perspective view of a portion of the engine shown in FIG. 1 including a FADEC with a data entry plug.

FIG. 2 is a perspective view of a pressure subsystem 300 that communicates with FADEC 284 (shown in FIG. 1). Pressure subsystem 300 may be housed in hollow compartment 280 (also shown in FIG. 1) or may be located elsewhere relative to engine 102. In the illustrated embodiment, pressure subsystem 300 includes a data entry plug 302 that may be used to communicate changes in operating states of components 210 of engine 102 (shown in FIG. 1) to FADEC 284.

Figure 3:
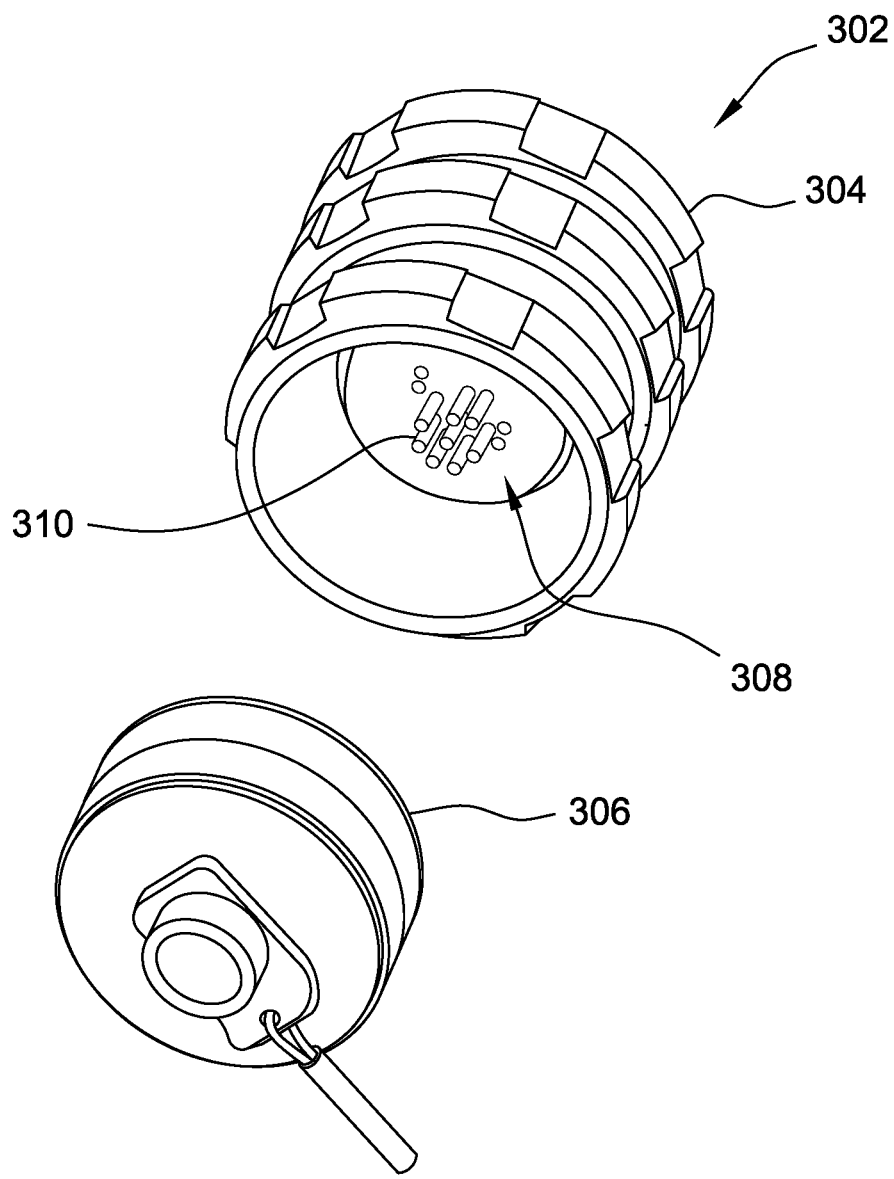
FIG. 3 is a perspective view of the data entry plug shown in FIG. 2.

FIG. 3 is a perspective view of data entry plug 302, which includes a housing 304 and a data entry plug cover 306. Removal of data entry plug cover 306, as shown in FIG. 3, enables access to an interior 308 of data entry plug 302, and thereby enables access to a plurality of configuration pins 310 housed therein. Although described as being embodied in pins, configuration pins 310 broadly include pins, jumpers, switches, and/or any other element that allows an adjustment to an operating parameter to be selected by a user or control system, either manually or automatically. Configuration pins 310 are manipulated (e.g., pushed in and/or pulled out) to control one or more operating parameters of machine 100, embodied as engine 102 (shown in FIG. 1) in the exemplary embodiment. More particularly, each configuration pin 310 is numbered, and a position of a configuration pin 310 (e.g., pushed in or pulled out) represents a binary indicator. Repositioning a particular set of configuration pins 310 communicates a change of one or more operating states of a component 210 (shown in FIG. 1) to FADEC 284. FADEC 284 interprets this state change and adjusts one or more operating parameters of engine 102 in response.

Figure 4:
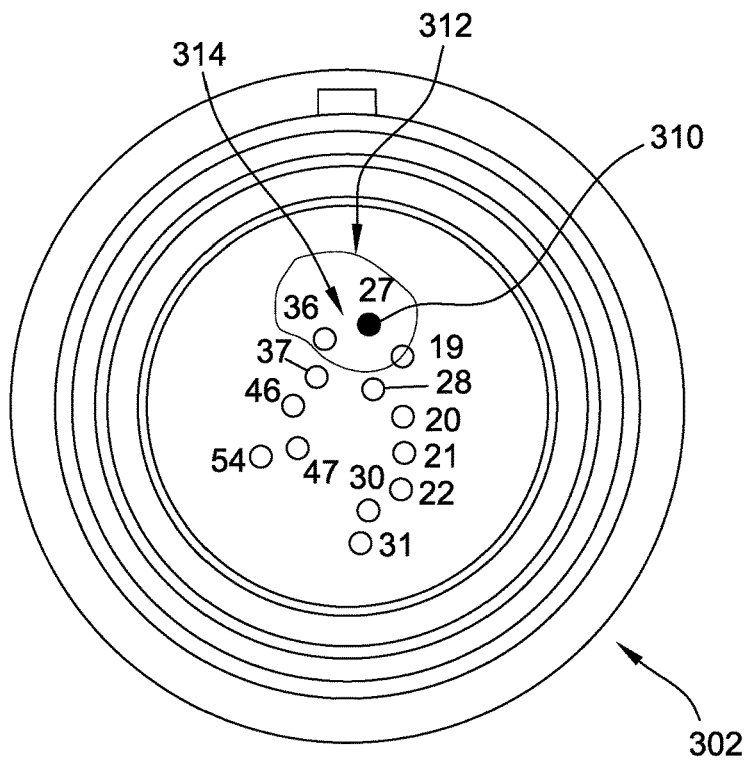
FIG. 4 illustrates a set of configuration pins of the data entry plug shown in FIG. 3 in a first position.
Figure 5:
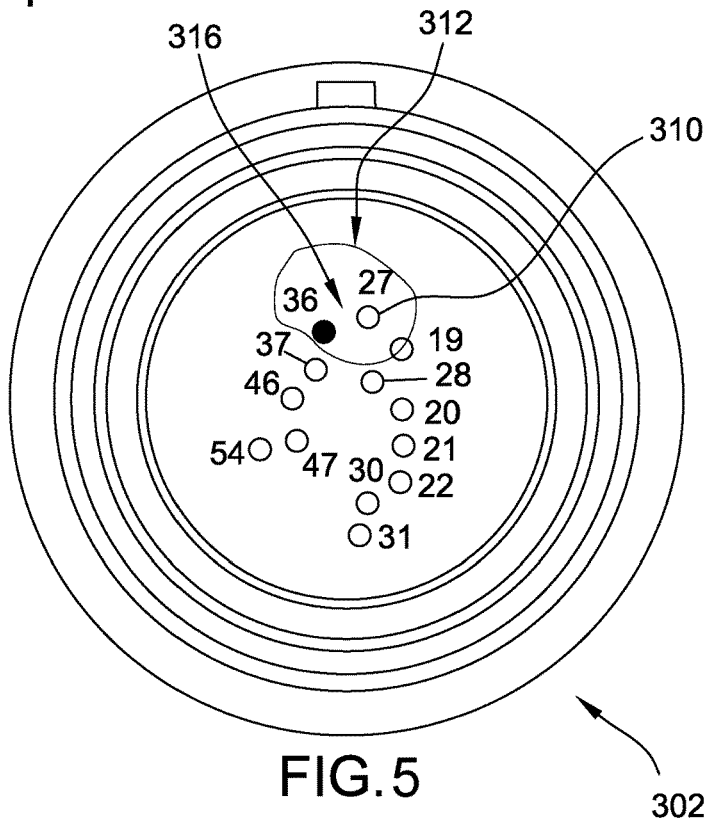
FIG. 5 illustrates the set of configuration pins shown in FIG. 4 in a second position.

FIGS. 4 and 5 illustrate one specific implementation of using data entry plug 302 to change, or select a predetermined adjustment to, an operating parameter of engine 102 (shown in FIG. 1). In particular, FIG. 4 illustrates a set 312 of configuration pins 310 in a first position 314, and FIG. 5 illustrates set 312 of configuration pins 310 in a second position 316. In the illustrated embodiment, having each configuration pin 310 of set 312 in first position 314 communicates to FADEC 284 that a rotating component 210 of engine 102, such as HP turbine 228, is in a first, initial, or non-deteriorated operating state. In the illustrated embodiment, as shown in Table 1 below, a first configuration pin labelled "27" is pushed in, in first position 314, and a second configuration pin labelled "36" is pulled out, in first position 314. FADEC 284 is programmed to recognize that having pins "27" and "36" in first position 314 indicates that HP turbine 228 is in an initial operating state, or a default state. FADEC 284 responds to this operating state of HP turbine 228 by controlling an operating parameter of engine 102, such as a cooling flow provided by cooling system 282. More particularly, FADEC 284 controls cooling system 282 to provide a predetermined amount of cooling such that HP turbine 228 has a predetermined clearance around the blades of HP turbine 228.

In response to one or more indicators that HP turbine 228 is deteriorated, as described further herein (and/or after a certain time-on-wing), a technician confirms that HP turbine 228 is operating in a non-initial operating state (e.g., a deteriorated operating state). For example, the technician may perform an inspection, such as by using a borescope (not shown), to examine a state of the blades of HP turbine 228. In one instance, if there is a clearance of more than 10 mils about the blades of HP turbine 228, HP turbine 228 is considered to be operating in a non-initial operating state. It should be understood that a clearance threshold for confirming certain operating states, such as a non-initial operating state, may be greater than or less than 10 mils, in alternative embodiments.

Thereafter, the technician selects a predetermined adjustment to an operating parameter (e.g., cooling flow provided by cooling system 282) that reduces an effect of operating HP turbine 228 in the non-initial operating state. In one embodiment, the technician manipulates each configuration pin 310 in set 312 into second position 316. In this particular embodiment, as indicated in Table 1, pin "27" is pulled out, in second position 316, and pin "36" is pushed in, in second position 316. Once both configuration pins 310 in set 312 are transitioned into second position 316, FADEC 284 is programmed to interpret this change as a change in operating state of HP turbine 228, specifically to a non-initial operating state. FADEC 284 responds to this operating state of HP turbine 228 by operating engine 102 according to the selected predetermined adjustment from the technician. Specifically, FADEC 284 controls cooling system 282 to provide an increased amount of cooling to reduce the clearance around turbine blades of HP turbine 228, thereby improving fuel efficiency of HP turbine 228 and increasing the operating lifetime thereof. Thus, data entry plug 302 is configured to enable manual selection of a predetermined adjustment to an operating parameter, in this case the cooling flow, such that the selected predetermined adjustment reduces an effect of operating component 210, in this case HP turbine 228, in a non-initial operating state on the performance of machine 100.

TABLE 1

HPT Operating State

| HPT OPERATING STATE | DATA ENTRY PLUG (PUSH-PULL PINS) | |
| --- | --- | --- |
| | HPT PIN 27 | HPT PARITY PIN 36 |
| INITIAL | PULL | PUSH |
| NON-INITIAL | PUSH | PULL |

In various other embodiments, operating state changes of a component 210 and/or predetermined adjustments to operating parameters in response to those operating state changes may be communicated to FADEC 284 using alternative methods. For example, data entry plug 302 may include one or more fusible links (not shown) instead of and/or in addition to configuration pins 310. As another example, an alternative electronic or electromechanical device may be in wireless or wired communication with FADEC 284 to facilitate adjustment of operating parameters of one or more components 210. The particular embodiment illustrated herein should therefore be understood to be non-limiting.

Figure 6:
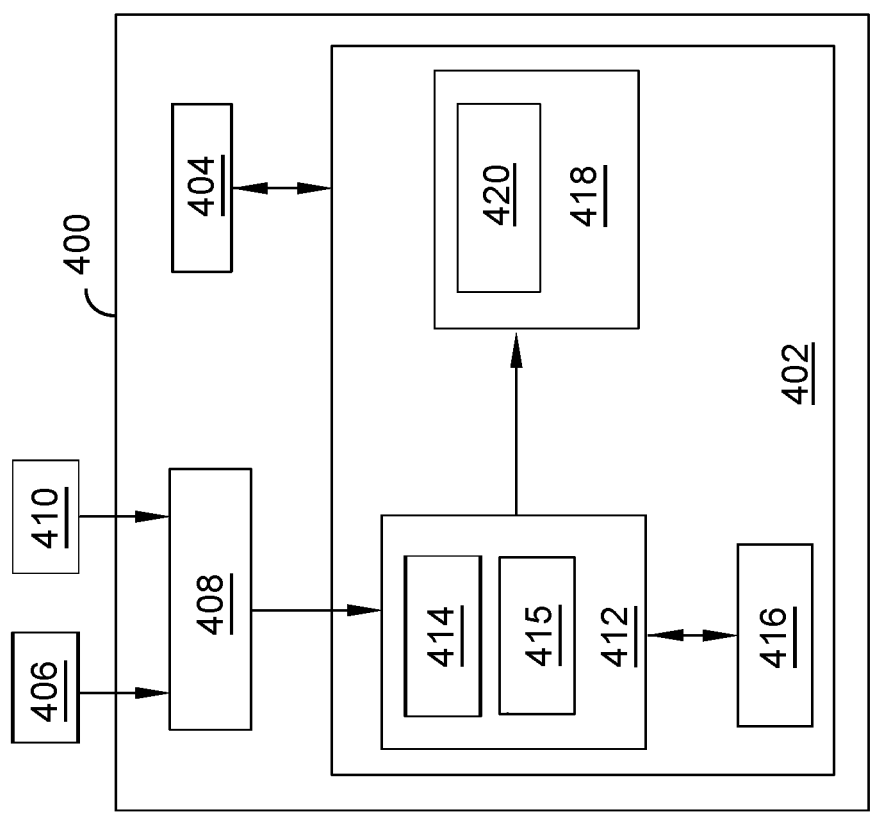
FIG. 6 is a schematic illustration of an exemplary electronic control unit (ECU) of the engine shown in FIG. 1.

FIG. 6 is a schematic illustration of an exemplary electronic control unit (ECU) 400 of machine 100 (e.g., engine 102, shown in FIG. 1). In the example embodiment, ECU 400 is integral to FADEC 284. Accordingly, where an action is described as being performed using FADEC 284, such action may be implemented using ECU 400. In another embodiment, ECU 400 is separate from and in communication with FADEC 284. In yet another embodiment, ECU 400 is a ground-based system that uses data downloaded from an aircraft or an aircraft engine (e.g., engine 102, shown in FIG. 1), or any other machine 100, to perform the various functions described herein. ECU 400 is configured to monitor operating conditions of machine 100 to detect when performance of machine 100 is degraded, which may be attributable to one of components 210 of machine 100 operating in a non-initial (e.g., deteriorated) state. In the illustrated embodiment, ECU 400 includes a processor 402 and a memory 404, and is in communication with at least one sensor 406 and sources of machine parameters 410, for example aircraft parameters such as flight phase data, altitude, Mach number, and/or bleed data. In some embodiments, sensor 406 includes one or more temperature and/or pressure sensors positioned throughout machine 100. For example, sensors 406 of engine 102 may include sensors 406 in and/or adjacent to one of fan 238, HP compressor 224, HP turbine 228, LP turbine 230, and/or any other component 210 of engine 102. In one particular embodiment, sensor 406 is a temperature sensor configured to measure and output an exhaust gas temperature (EGT) of HP turbine 228.

ECU 400 further includes a communication interface 408, such that ECU 400 is capable of communicating with a remote device such as sensor 406 and one or more machine control systems or other sources of machine parameters 410 (e.g., sources of aircraft parameters). Communication interface 408 may include, for example, a wired or wireless network adapter or a wireless data transceiver for use with a network. For example, communication interface 408 may be in wired or wireless communication with an aircraft control system or other sources of machine parameters 410 and may receive signals (e.g., requests, instructions, values) therefrom.

Processor 402 is configured to execute computer-readable instructions (stored, for example, in memory 404) to implement a health assessment module 412. Health assessment module 412 is configured to process sensor data from sensor(s) 406 and/or machine parameters from sources of machine parameters 410 to estimate the health of various components 210 of machine 100, such as HP turbine 228, LP turbine 230, LP compressor 222, HP compressor 224, and/or fan 238 of engine 102, throughout the lifetime thereof. It should be understood that health assessment module 412 may be configured to monitor the health of other component(s) 210 of engine 102 as well. In one embodiment, health assessment module 412 includes a model 414, which includes or is otherwise in communication with a tracking filter 415. In one embodiment, model 414 is a model of engine 102 that models expected engine performance (e.g., engine conditions and aircraft parameters) according to flight phase, engine age, time-on-wing, and/or other parameters. In alternative embodiments, model 414 is any suitable model of machine 100 that models any suitable expected operating conditions and parameters associated with machine 100. Tracking filter 415, put broadly, is a parameter estimation algorithm used to tune or calibrate model 414 in accordance with actual machine characteristics, as determined using sensor data from sensor(s) 406 and/or parameters from sources of machine parameters 410. In other words, tracking filter 415 identifies discrepancies between model 414 and actual machine conditions and tunes model 414 accordingly. Health assessment module 412 is configured to monitor these discrepancies as an estimation of the health of one or more components 210 of machine 100.

In the example embodiment, health assessment module 412 is configured to monitor a plurality of operating parameters to determine whether a performance of engine 102 is degraded and/or whether one or more component(s) 210 of engine 102 is operating in a non-initial operating state. For example, health assessment module 412 monitors an EGT and/or EGT margin of HP turbine 228, an efficiency of one or more components 210 of engine 102 (e.g., HP turbine 228 efficiency), and/or a fuel flow of engine 102 during one or more flight phases (e.g., a cruise fuel flow). Health assessment module 412 is further configured to identify the one or more component(s) 210 that are operating in a non-initial operating state and causing the performance degradation. In one particular embodiment, health assessment module 412 uses model 414 to identify the one or more component(s) 210 component of engine 102 that are operating in a non-initial operating state and/or are a source of performance degradation of engine 102. Continuing with the above examples, when the EGT margin falls below a predetermined threshold, when the component efficiency falls below a predetermined threshold, and/or the engine fuel flow exceeds a predetermined threshold, health assessment module 412 determines that one or more component(s) 210 of engine 102 is operating in a non-initial operating state and identifies which component(s) 210 is operating in the non-initial operating state. In at least some embodiments, health assessment module 412 detects a non-initial operating state of a component 210 of engine 102, and the operating state is confirmed using one or more manual inspection techniques (e.g., using a borescope). Such manual confirmation facilitates increasing an accuracy or confidence level of health assessment module 412. Introducing manual confirmation steps also facilitates entry of a parameter, for example, via configuration pin setting in data entry plug 302 (shown in FIG. 2), that can be interpreted by ECU 400.

In some embodiments, output from health assessment module 412 may be stored in a learning module 416 and/or retrieved therefrom for calibration purposes (e.g., calibration of model 414 and/or of other aircraft systems, not shown in FIG. 6).

Processor 402 further includes a control module 418 configured to interpret output from health assessment module 412 to adjust operating parameters 420 of one or more components 210 of engine 102 operating in a non-initial operating state. Additionally or alternatively, control module 418 interprets manually entered parameters, such as those entered via configuration pin setting in data entry plug 302, to adjust operating parameters 420.

In the example embodiment, control module 418 is configured to select from one or more predetermined adjustments to an operating parameter 420 of engine 102 to implement in response to determined performance degradation of engine 102. In some embodiments, selecting a predetermined adjustment to an operating parameter 420 includes identifying an operating parameter 420 associated with operation of component(s) 210 operating in a non-initial operating state. In some embodiments, selecting a predetermined adjustment to an operating parameter 420 includes selecting a set of a plurality of operating parameters 420 that provides a predetermined adjustment to the plurality of operating parameters 420 of engine 102. Operating parameters 420 may include, for example, cooling flow, operating speed, fuel flow to a component 210, oil flow (pressure and/or volume) to a component 210, electrical characteristics (e.g., applied current), timing of component operation, and/or position. Adjustments to operating parameters 420 for any component 210 based on an operating state of the component 210 may be pre-programmed into ECU 400 and/or FADEC 284, may be provided within an operations manual for machine 100, and/or may be otherwise predetermined.

In one particular embodiment, control module 418 is configured to adjust operating parameters 420 of cooling system 282 such that cooling of the component(s) 210 operating in non-initial operating state(s) is increased. Thus, control module 418 is configured to enable automatic selection of a predetermined adjustment to an operating parameter 420, in this case the cooling flow, such that the selected predetermined adjustment reduces an effect of component 210 operating in the non-initial operating state on the performance of machine 100, in this case engine 102. Increased cooling facilitates reducing a clearance gap in the deteriorated component 210, thereby improving fuel efficiency of the component 210 and/or increasing a lifetime thereof. In one example embodiment, reducing a clearance gap in a rotating component 210 (e.g., HP turbine 228, LP turbine 230, HP compressor 224) may facilitate recovering about 10° C. hot-day take-off EGT margin and 1% reduction in engine fuel burn.

Figure 7:
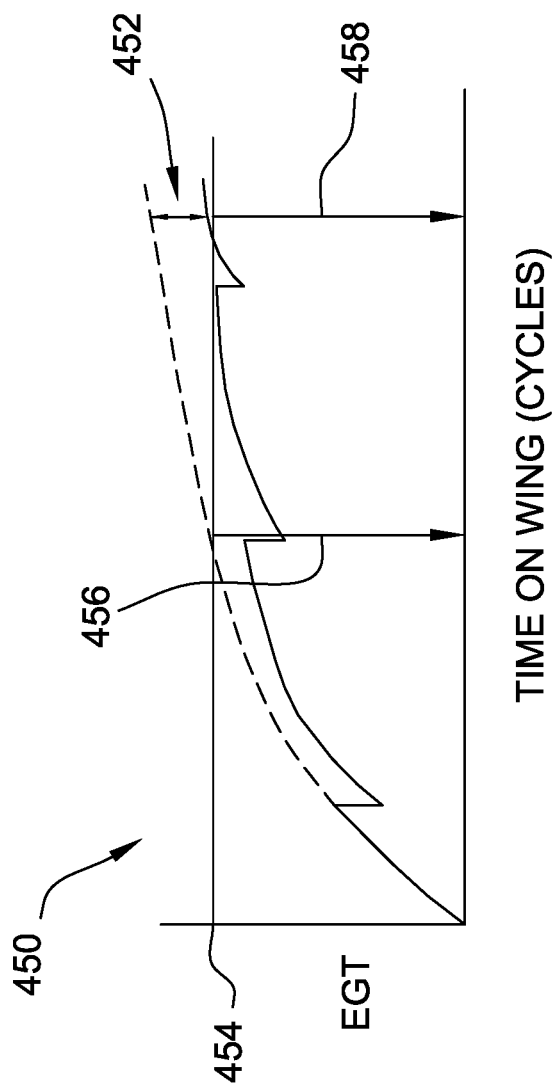
FIG. 7 is a plot illustrating a change in exhaust gas temperature (EGT) of an engine component using the ECU shown in FIG. 6.

FIG. 7 illustrates a plot 450 of a change in EGT 452 using ECU 400 to model component operating state and subsequently direct modification of operating parameters. Without implementing ECU 400 as described herein, EGT of HP turbine 228 reaches an EGT operational limit 454 after a first number of cycles 456, or a first amount of time-on-wing. Using ECU 400 to monitor EGT, the operating state or health of HP turbine 228 is monitored. Accordingly, a reduction in clearance around the blades of HP turbine 228 is implemented (e.g., manually, using data entry plug 302, and/or automatically, as described herein) at least once during the operational lifetime of HP turbine 228. EGT of HP turbine 228 is reduced, and the time-on-wing of HP turbine 228 is increased. More particularly, HP turbine 228 reaches EGT operational limit 454 after a second, greater number of cycles 458.

As illustrated using plot 450, the health of a component 210 (e.g., the operating state of HP turbine 228) may not be a binary value (e.g., non-deteriorated vs. deteriorated) but rather may have additional values. In such embodiments, the methods and systems described herein may be used a plurality of times to increase cooling of a component 210 operating in a non-initial operating state. In at least some alternative embodiments, ECU 400 may be configured to gradually implement an increase in cooling to a component 210, to facilitate the reduction in clearance and improvement in component efficiency described herein over time. In such alternative embodiments, for example, model 414 may determine incremental changes in component operating state, and control module 418 may implement corresponding incremental changes in operating parameters 420 of cooling system 282. Additionally or alternatively, control module 418 may determine a total adjustment for the operating parameter 420 that is estimated to restore at least a portion of the degraded performance of engine 102, such as a total increase in cooling to provide to HP turbine 228 to reduce clearance about the blades of HP turbine 228. Control module 418 may be further configured to implement changes to operating parameters 420 less than the total adjustment, for instance, to reduce a likelihood of blade rub. In such embodiments, control module 418 may divide the total adjustment into a plurality of increments to be performed over a period of time, for example, into a first adjustment and a second adjustment that together approximate the total adjustment. Additionally or alternatively, control module 418 may automatically implement a first adjustment for operating parameter 420 that is less than the determined adjustment, and a second adjustment for operating parameter 420 may be manually implemented, as described above, such that the first adjustment and second adjustment together approximate the determined total adjustment. Alternatively, control module 418 may implement only a portion of the total adjustment.

In one embodiment, the increase in time-on-wing is dependent upon a 10 mil clearance gap recovery (associated with the about 10° C. hot-day take-off EGT margin). Accordingly, a greater increase in time-on-wing may be associated with a greater recovery distance of the clearance gap and/or a lower increase in time-on-wing may be associated with a reduced recovery distance of the clearance gap. Moreover, in one example embodiment, the reduction in clearance gap is implemented in a component 210 of engine 102 at a mid- to late-life stage of the component 210. In such embodiments, significant deterioration or change in the operating state is more likely to have occurred in the component 210. Accordingly, a likelihood of blade rub after the clearance gap closure is reduced.

In one embodiment, upon determination that the one or more component(s) 210 is operating in a non-initial operating state, ECU 400 sets a fault that can be cleared using data entry plug 302. Specifically, updating the configuration of configuration pins 310 in data entry plug 302, as described above, causes FADEC 284 and/or ECU 400 to update operating parameters 420 of the component(s) 210 operating in the non-initial operating state. In one particular example, operating parameters 420 of cooling system 282 are updated to reduce turbine clearances of an HP turbine 228 operating in a non-initial operating state.

Figure 8:
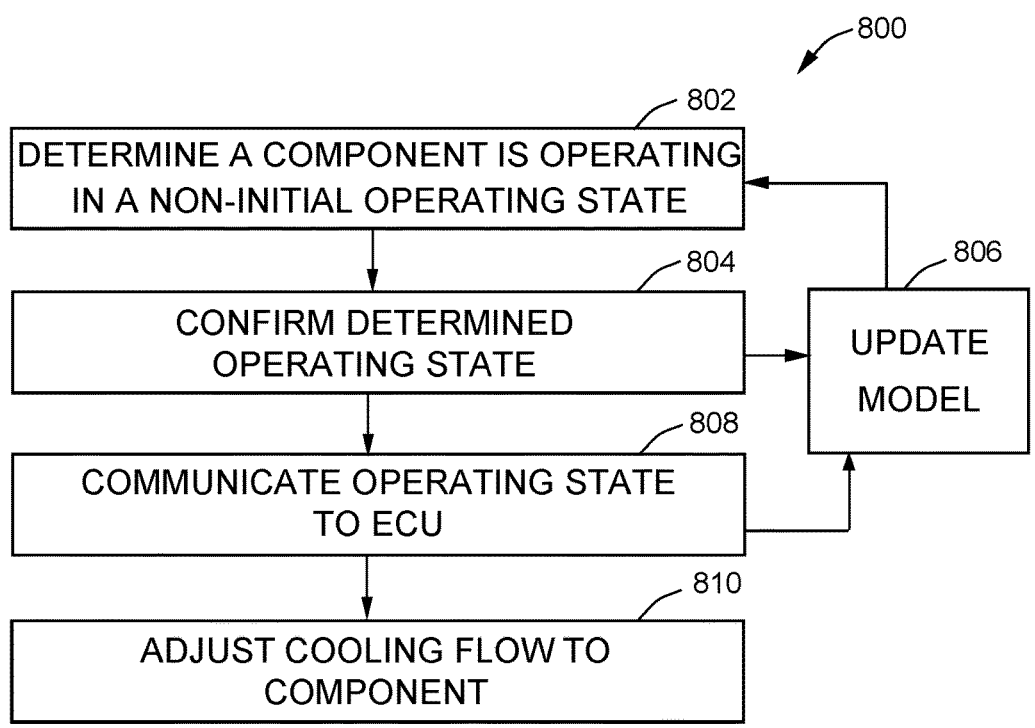
FIG. 8 is a flowchart of an exemplary method for adjusting an operating parameter of a machine component based on an operating state of the machine component.

FIG. 8 depicts a flowchart of one specific embodiment of a method 800 for adjusting an operating parameter of machine 100 based on an operating state component 210. One or more steps of method 800 may be implemented using one or more automated control systems of machine 100, such as FADEC 284 (shown in FIG. 1) and/or electronic control unit (ECU) 400 (shown in FIG. 6) for aircraft systems. Additionally or alternatively, one or more steps of method 800 may be implemented using a ground-based system in communication with an aircraft system, the ground-based system using data downloaded from the aircraft system.

Method 800 includes, in the illustrated embodiment, determining 802 that a component 210 of machine 100 is operating in a non-initial operating state. In certain embodiments, component 210 is a rotating component of machine 100. The component 210 may include, but is not limited to, HP turbine 228, LP turbine 230, fan 238, HP compressor 224, and/or any other component 210 of engine 102 (all shown in FIG. 1). In some embodiments, determining 802 is performed analytically, as described with respect to FIG. 6. In other embodiments, determining 802 is performed manually, such as by periodically inspecting the component 210. For example, an engine technician may periodically inspect HP turbine 228 to determine 802 whether HP turbine 228 is operating in a non-initial operating state (e.g., in a deteriorated operating state).

Method 800 also includes confirming 804 the operating state of the component 210 determined in step 802. In some embodiments, such as those embodiments in which determining 802 is performed analytically using ECU 400 (or a ground-based system using downloaded data), ECU 400 may transmit an alert that notifies an engine technician to confirm 804 whether the component 210 is operating in the non-initial operating state. For example, the confirmation may be accomplished via a manual inspection (e.g., using a borescope). If the component 210 is operating in an initial state (e.g., is not deteriorated), the engine technician may cause an update 806 of model 414 (and/or of any other system used to analytically determine 802 the deterioration). For instance, the engine technician may inform an engineer that may update model 414, or the engine technician may communicate a message to ECU 400 indicating that the component 210 is operating in an initial state. If the component 210 is operating in the non-initial state, the engine technician may still cause update 806 of model 414 by positively confirming 804 the operating state. As model 414 is refined over several iterations of the determining 802-confirming 804-updating 806 process, confirming 804 may eventually be omitted.

Method 800 further includes communicating 808 the operating state of the component 210 (for example, after positive confirmation in step 804) to ECU 400. As described herein, in the example embodiment, communicating 808 may include setting configuration pins 310 in data entry plug 302 (shown and described with respect to FIGS. 2-5). In an alternative embodiment, communicating 808 may include entering a value into an electronic interface communicatively coupled to ECU 400, wherein the value is preset to communicate 808 to ECU 400 the changed operating state of the component 210. In response to communicating 808, as described above, ECU 400 may select an adjustment to one or more operating parameters 420 (shown in FIG. 6) of the component 210. In some embodiments, as model 414 is refined over several iterations of the determining 802-confirming 804-updating 806-communicating 808 process, communicating 808 may eventually be omitted. In other words, once model 414 is sufficiently refined, ECU 400 may automatically adjust operating parameters 420.

In the illustrated embodiment, method 800 includes adjusting 810 cooling flow to the component 210 operating in the non-initial operating state. Specifically, adjusting 810 includes increasing cooling flow to the component 210. For example, ECU 400 causes cooling system 282 (shown in FIG. 1) to increase cooling flow to a HP turbine 228 operating in the non-initial operating state. The increased cooling flow reduces clearance around the blades of HP turbine 228, thereby increasing time-on-wing of the HP turbine 228 and reducing fuel burn thereby.

It is contemplated that varying combinations of manual and/or automated steps may be implemented as part of method 800 without departing from the scope of the present disclosure. In addition, it should be understood that the systems and methods disclosed herein are applicable to components 210 of engines and/or machines other than HP turbine 228. For instance, ECU 400 may be configured to control cooling system 282 to provide additional cooling to any rotating system of engine 102, in order to reduce a clearance gap around blades thereof. Moreover, the present disclosure is equally applicable to rotating components 210 and the operating parameters thereof, in machinery other than aircraft engines.

The above-described systems provide an efficient method for adjusting an operating parameter of a machine based on an operating state of a component of the machine. Specifically, the above-described systems include an electronic control unit (ECU) configured to monitor (e.g., using sensors) and model the health of a component. Upon determining that the component is operating in a non-initial operating state, the ECU directs implementation of a change in operating parameters of the machine (e.g., additional cooling flow by a cooling system to the component), using one or more of manual and automatic means. Accordingly, operating parameters of the components are adjusted to facilitate improving efficiency and/or performance of the components. In addition, the operational lifetime of the components may be increased, reducing the cost of operating the machine.

An exemplary technical effect of the methods, systems, and apparatus may be implemented by performing at least one of the following steps: (a) determining that a performance of a machine has degraded; (b) selecting a predetermined adjustment to the operating parameter, wherein the selected predetermined adjustment reduces an effect of the component deterioration on the performance of the machine; and (c) operating the machine using the selected predetermined adjustment to the operating parameter. Exemplary technical effects of the methods, systems, and apparatus may be additionally or alternatively implemented by performing at least one of the following steps: (d) determining that a component of an engine is operating in a non-initial operating state; (e) confirming the operating state of the component; (f) communicating the confirmed operating state to an electronic control unit of the engine; and (g) adjusting a cooling flow to the component.

An exemplary technical effect of the methods, systems, and apparatus described herein includes at least one of: (a) improving efficiency and/or performance of a machinery component operating in a non-initial operating state (e.g., a deteriorated machinery component); (b) improving efficiency and/or performed of an overall machine operating with a machinery component operating in a non-initial operating state; (c) extending the operating lifetime of a machinery component; and (d) reducing costs of the overall machine by extending the lifetime of components thereof.

Exemplary embodiments of methods and systems for adjusting an operating parameter of a machine based on an operating state of a component of the machine are described above in detail. The methods and systems are not limited to the specific embodiments described herein, but rather, components of the systems and/or steps of the methods may be utilized independently and separately from other components and/or steps described herein. Moreover, the embodiments can be implemented and utilized in connection with many other machinery applications, including those that are currently configured to use cooling systems to affect clearance of rotating machinery components. For example, the methods and systems may also be used in combination with other machines including rotating components that deteriorate or change operating state over time and would benefit from adjusted operating parameters to compensate for the change in operating state.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for adjusting an operating parameter of a gas turbine engine based on an operating state of a component of the gas turbine engine, said method comprising:
    determining that a performance of the gas turbine engine has degraded over time;
    selecting a predetermined adjustment to the operating parameter, wherein the selected predetermined adjustment reduces an effect of the operating state of the component on the performance of the gas turbine engine;
    manually implementing the selected predetermined adjustment of the operating parameter using a data entry plug, wherein configuration pins of the data entry plug are moved to either a pulled position or a pushed position to manually implement the selected predetermined adjustment; and
    operating the machine using the selected predetermined adjustment to the operating parameter.

2. The method of claim 1, further comprising identifying the component of the machine that has caused the performance degradation.

3. The method of claim 2, wherein identifying the component of the machine that has caused the performance degradation comprises implementing a model of at least a portion of the machine that models an expected performance of the machine and compares the actual performance to the expected performance.

4. The method of claim 3, wherein implementing the model comprises determining the actual performance using sensor data from at least one sensor associated with the component of the machine that has caused the performance degradation.

5. The method of claim 2, further comprising identifying the operating parameter of the machine that is associated with the operation of the identified component.

6. The method of claim 2, further comprising confirming the operating state of the component of the machine.

7. The method of claim 6, wherein confirming the operating state of the component comprises performing an inspection to confirm the operating state of the component.

8. The method of claim 1, wherein selecting the predetermined adjustment to the operating parameter comprises:
   determining a total adjustment for the operating parameter that is estimated to restore at least a portion of the degraded performance; and
   automatically implementing a first adjustment for the operating parameter that is less than the determined adjustment.

9. The method of claim 8, further comprising manually implementing a second adjustment for the operating parameter such that the first adjustment and second adjustment approximate the determined total adjustment.

10. The method of claim 1, wherein operating the machine using the selected predetermined adjustment to the operating parameter comprises increasing an amount of cooling flow to the component.

\* \* \* \* \*